(12) United States Patent
Nagai et al.

(10) Patent No.: US 7,439,968 B2
(45) Date of Patent: Oct. 21, 2008

(54) DISPLAY DEVICE

(75) Inventors: Hisashi Nagai, Daito (JP); Koichi Tsutsumi, Higashiosaka (JP); Shinji Sato, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 547 days.

(21) Appl. No.: 10/157,055

(22) Filed: May 30, 2002

(65) Prior Publication Data

US 2003/0024683 A1 Feb. 6, 2003

(30) Foreign Application Priority Data

Jun. 4, 2001 (JP) ............................. 2001-168663

(51) Int. Cl.
*G09G 5/00* (2006.01)
(52) U.S. Cl. ..................... 345/211; 345/101; 345/102; 345/214
(58) Field of Classification Search ................ 345/211, 345/101–102, 214
See application file for complete search history.

(56) References Cited

U.S. PATENT DOCUMENTS 5,813,233 A * 9/1998 Okuda et al. .................. 62/3.7
6,825,828 B2 * 11/2004 Burke et al. ................ 345/101

FOREIGN PATENT DOCUMENTS

| DE | 2726467 | * | 12/1978 |
| JP | 05-076713 | * | 3/1993 |
| JP | 07-063405 | | 3/1995 |
| JP | 08-178274 A | * | 7/1998 |
| JP | 11-84534 | | 3/1999 |
| JP | 2000-153121 | | 6/2000 |
| SE | EP 0 094 360 | * | 5/1983 |

OTHER PUBLICATIONS

Office Action from the Japanese Patent Office dated Jan. 11, 2006 in the corresponding Japanese patent application No. 2001-168663.
Office Action from Japanese Patent Office dated Apr. 5, 2006 in the corresponding Japanese patent application.

* cited by examiner

*Primary Examiner*—Richard Hjerpe
*Assistant Examiner*—Leonid Shapiro
(74) *Attorney, Agent, or Firm*—Westerman, Hattori, Daniels & Adrian, LLP.

(57) ABSTRACT

In a display device comprising a cooling suction fan and an air filter arranged on the suction side of the cooling suction fan, there are provided first means for measuring the value of a current flowing through a power supply line to the cooling suction fan for each predetermined time period, and second means for judging that the air filter is clogged when the measured current value is not more than a predetermined reference value, to inform the user that the air filter is clogged.

6 Claims, 2 Drawing Sheets

DISPLAY DEVICE

BACKGROUND OF THE INVENTION

1. Field of the Invention

The present invention relates to a display device such as a liquid crystal projector.

2. Description of the Prior Art

Optical components such as a liquid crystal panel, a light source lamp for backlight arranged on a rear surface of the liquid crystal panel, and a polarizing plate are provided inside a casing of a liquid crystal projector. A cooling suction fan for preventing the optical components from being degraded due to the rise in temperature by turning the light source lamp for backlight on is provided inside the casing of the liquid crystal projector. Further, an air filter is provided in order for dust and dirt not to enter the casing in case of suction by the cooling suction fan.

When the liquid crystal projector is used for a long time period in an environment where air is dirty, the air filter is clogged, so that the capability of suction by the cooling suction fan is lowered. Accordingly, the temperature rises, thereby degrading the optical components.

SUMMARY OF THE INVENTION

An object of the present invention is to provide a display device capable of detecting the clogging of an air filter, to inform a user of the clogging.

In a display device comprising a cooling suction fan and an air filter arranged on the suction side of the cooling suction fan, a first display device according to the present invention is characterized by comprising first means for measuring the value of a current flowing through a power supply line to the cooling suction fan for each predetermined time period; and second means for judging that the air filter is clogged when the measured current value is not more than a predetermined reference value, to inform the user that the air filter is clogged.

An example of the second means is one for turning a warning light on when the measured current value is not more than the predetermined reference value.

In a display device comprising a cooling suction fan and an air filter arranged on the suction side of the cooling suction fan, a second display device according to the present invention is characterized by comprising a first circuit for measuring the value of a current flowing through a power supply line to the cooling suction fan for each predetermined time period; and a second circuit for judging that the air filter is clogged when the measured current value is not more than a predetermined reference value, to inform the user that the air filter is clogged.

An example of the second circuit is one for turning the warning light on when the measured current value is not more than the predetermined reference value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
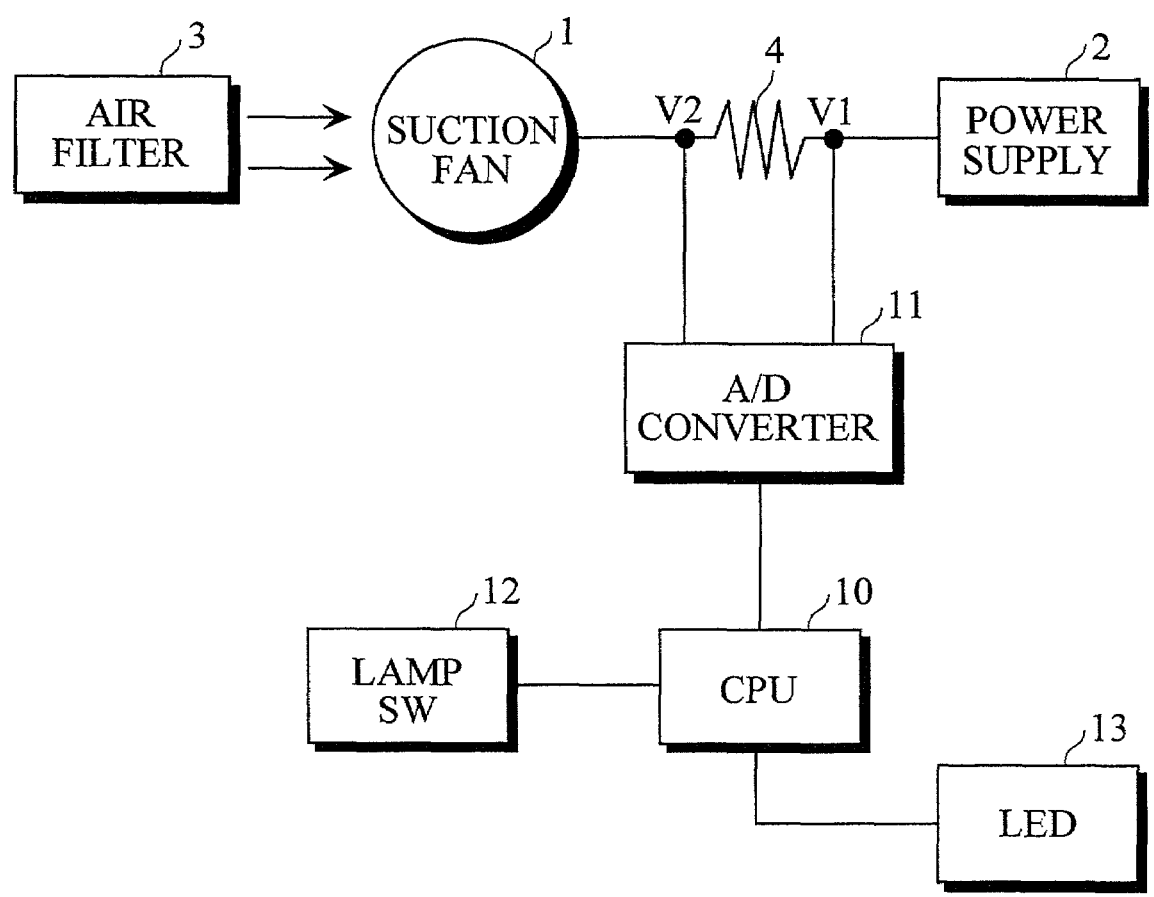
FIG. 1 is a block diagram showing a circuit for detecting the clogging of an air filter provided in a liquid crystal projector.

Referring now to the drawing, an embodiment in a case where the present invention is applied to a liquid crystal projector will be described.

FIG. 1 is a circuit for detecting the clogging of an air filter provided in the liquid crystal projector.

Reference numeral 1 denotes a cooling suction fan (hereinafter merely referred to as a suction fan) provided inside a casing of the liquid crystal projector, and reference numeral 2 denotes a power supply for driving the suction fan. Reference numeral 3 denotes an air filter provided between the suction fan 1 and a suction port provided in the casing.

A current detecting resistor 4 is inserted into a power supply line for connecting the power supply 2 and the suction fan 1. Potentials V1 and V2 at both ends of the resistor 4 are inputted to a CPU 10 through an A/D converter 11.

A lamp switch (LAMP SW) 12 for turning a light source lamp for backlight (not shown) on or off, a warning light (a light emitting diode (LED)) 13 for informing a user that the air filter 3 is clogged, and so forth are connected to the CPU 10.

As can be seen from the results of an experiment in Table 1, described later, when the air filter 3 is not clogged, a current flows through the power supply line to the suction fan 1, as usual. When the air filter 3 is clogged, however, the value of the current flowing through the power supply line to the suction fan 1 decreases.

Table 1 shows the results of the measurement (the results of the experiment) of the value (unit: mA) of the current flowing through the power supply line to the suction fan under a plurality of different conditions.

The maker name, the type name, and so forth of the suction fan 1 used in the experiment are as follows:

Maker name:Toshiba Home Technology Corporation
Type name:SF80H12-3
Power supply:DC current
Fan type:Scirocco fan
Rating voltage:DC12V

TABLE 1

| Supply voltage | Suction-side opened | Set mounted state | Full opened state | Right half closed state | Left half closed state |
|---|---|---|---|---|---|
| 9 V | 492 | 338 | 220 | 269 | 282 |
| 12 V | 715 | 483 | 311 | 378 | 410 |
| 15 V | 914 | 630 | 398 | 498 | 539 |

"Suction-side opened" indicates a case where the suction fan alone is used, and the suction fan is driven in a state where its suction-side portion is opened.
"Set mounted state" indicates a case where the suction fan is driven in a state where the suction fan is mounted on the liquid crystal projector.
"Full opened state" indicates a case where the suction fan is driven in a state where the suction fan is mounted on the liquid crystal projector and the whole suction-side portion is closed.
"Right half closed state" indicates a case where the suction fan is driven in a state where the suction fan is mounted on the liquid crystal projector and the right half of the suction-side portion is closed.
"Left half closed state" indicates a case where the suction fan is driven in a state where the suction fan is mounted on the liquid crystal projector and the left half of the suction-side portion is closed.

As can be seen from Table 1, the larger the area of the closed suction-side portion of the suction fan becomes, the smaller the value of the current flowing through the power supply line to the suction fan becomes. In a case where the suction fan is mounted on the liquid crystal projector, therefore, the higher the degree of the clogging of the air filter 3 becomes, the smaller the value of the current flowing through the power supply line to the suction fan becomes.

Figure 2:
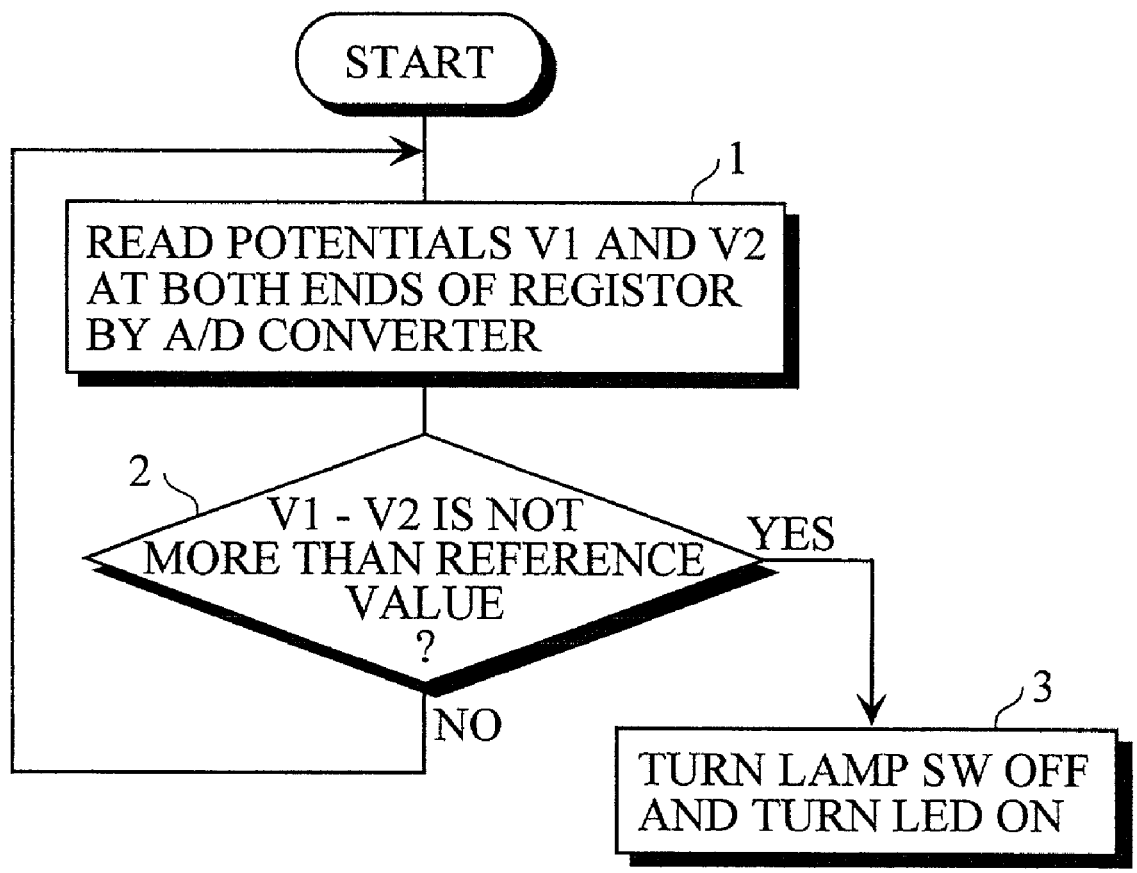
FIG. 2 is a flow chart showing the procedure for processing for detecting the clogging of an air filter 3 by a CPU 10.

FIG. 2 shows the procedure for processing for detecting the clogging of the air filter 3 by the CPU 10.

The CPU 10 reads potentials V1 and V2 at both ends of the current detecting resistor 4 for each predetermined time period (step 1). When the potentials V1 and V2 are read, it is judged whether or not a potential difference (V1–V2) is not more than a predetermined reference value (step 2). The smaller the value of the current flowing through the current detecting resistor 4 becomes, the smaller the potential difference (V1–V2) becomes. That is, the potential difference (V1–V2) is proportional to the value of the current flowing through the current detecting resistor 4.

When the potential difference (V1–V2) is larger then the predetermined reference value, it is judged that the air filter 3 is not clogged, after which the program is returned to the step 1.

When the potential difference (V1–V2) is not more than the predetermined reference value, it is judged that the air filter 3 is clogged, to turn the lamp switch 12 off and turn the light emitting diode 13 on (step 3). Consequently, the light source lamp for backlight is turned off, and the user is informed that the air filter 3 is clogged. The user cleans the air filter 3, and replaces the air filter 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a display device comprising a cooling suction fan and an air filter arranged on the suction side of the cooling suction fan, a display device comprising
    a first circuit for measuring a value proportional to a current flowing through a power supply line to the cooling suction fan for a predetermined time period; and
    a second circuit for judging that the air filter is clogged when the measured value obtained during said predetermined time period is not more than a predetermined reference value, to inform the user that the air filter is clogged.

2. The display device according to claim 1, wherein the second circuit turns the warning light on when the measured value is not more than the predetermined reference value.

3. In a display device comprising a cooling suction fan and an air filter arranged on the suction side of the cooling suction fan, a display device comprising
    an A/D converter for measuring a value proportional to a current flowing through a power supply line to the cooling suction fan for a predetermined time period; and
    a central processing unit for judging that the air filter is clogged when the measured value obtained during said predetermined time period is not more than a predetermined reference value, to inform the user that the air filter is clogged.

4. The display device according to claim 3, wherein the central processing unit turns a warning light on when the measure value is not more than the predetermined reference value.

5. In a display device comprising a cooling suction fan and an air filter arranged on the suction side of the cooling suction fan, a display device comprising
    a first circuit for measuring a potential difference across a resistor located in a power supply line to the cooling suction fan for a predetermined time period; and
    a second circuit for judging that the air filter is clogged when the potential difference obtained during said predetermined time period is not more than a predetermined reference value, to inform the user that the air filter is clogged.

6. The display device according to claim 5, wherein the second circuit turns a warning light on when the potential difference is not more than the predetermined reference value.

* * * * *